United States Patent [19]

Robert

[11] Patent Number: 5,464,186
[45] Date of Patent: Nov. 7, 1995

[54] VERTICAL MEMBER SUPPORT STAND

[76] Inventor: Jacques Robert, 102, 312 - 3rd Avenue NE., Calgary, Alberta, Canada, T2E 0H4

[21] Appl. No.: 235,888

[22] Filed: May 2, 1994

[51] Int. Cl.⁶ ..................................................... F16M 13/00
[52] U.S. Cl. ............................................................... 248/524
[58] Field of Search .................................... 248/524, 523, 248/525, 526, 519

[56] References Cited

U.S. PATENT DOCUMENTS

| | | | |
|---|---|---|---|
| 1,497,683 | 6/1924 | Hall | 248/526 |
| 1,714,498 | 5/1929 | Danner | 248/524 |
| 1,729,129 | 9/1929 | Seelav | 248/525 |
| 2,679,994 | 6/1954 | Mellen | 248/526 X |
| 2,891,747 | 6/1959 | Steede | 248/524 X |
| 3,136,514 | 6/1964 | Rzepella | 248/524 X |
| 3,301,512 | 1/1967 | Nyberg | 248/524 |
| 3,562,951 | 2/1971 | Schwaderlapp | 47/41.11 |
| 3,693,918 | 9/1972 | Fisher et al. | 248/524 X |
| 5,160,110 | 11/1992 | Praegitzer | 248/523 |

FOREIGN PATENT DOCUMENTS

WO91/04696  4/1991  WIPO .

Primary Examiner—Ramon O. Ramirez
Attorney, Agent, or Firm—Anthony R. Lambert

[57] ABSTRACT

A vertical member support stand is described which includes a body with a generally tubular vertical member receiving cavity. The cavity has a bottom, a top opening, and circumferential sidewalls. At least three upper pressure members are substantially equally spaced around the circumferential sidewalls of the vertical member receiving cavity adjacent the top opening. The pressure members are pivotally mounted whereby they are pivoted into engagement with a vertical member positioned in the vertical member receiving cavity. At least three lower pressure members are substantially equally spaced around the circumferential sidewalls of the vertical member receiving cavity adjacent the bottom. The pressure members are pivotally mounted whereby they are pivoted into engagement with a vertical member positioned in the vertical member receiving cavity. The pressure members are locked in a selected pivotal position such that they securely hold the vertical member.

7 Claims, 3 Drawing Sheets

VERTICAL MEMBER SUPPORT STAND

The present invention relates to a vertical member support stand.

BACKGROUND OF THE INVENTION

There are a variety of objects that are supported in an upright position during use. In order to support them in an upright position a support stand is used. The objects being supported can take the form of a variety of vertical members. Some examples of such vertical members are poles or standards bearing banners, flags, signs, etc. The number of potential applications for such vertical member support stands is almost infinite.

Most vertical member support stands can effectively hold and support a vertical member that is substantially symmetrical. When the vertical member is not symmetrical, however, there is a danger that one of the pressure members will release it's grip resulting in a rapid and violent falling of the vertical member.

The most common example of a vertical member support stand that must support an asymmetrical member is a tree stand. The tree stand is used to support a tree in an upright position after its root system has been severed. The most common use of a tree stand is to support Christmas Trees during the Christian celebration of the birth of Jesus Christ. The trunks of trees are not perfectly cylindrical, they are therefore very difficult to firmly grasp. Furthermore, the branches of the tree do not extend radially in a perfectly symmetrical fashion. This results in an uneven weight distribution leading to a marked tendency for the tree to lean in a particular direction.

SUMMARY OF THE INVENTION

What is required is a vertical member support stand that is better at holding asymmetrical members.

According to the present invention there is provided a vertical member support stand which includes a body with a generally tubular vertical member receiving cavity. The cavity has a bottom, a top opening, and circumferential sidewalls. At least three upper pressure members are substantially equally spaced around the circumferential sidewalls of the vertical member receiving cavity adjacent the top opening. The pressure members are pivotally mounted whereby they are pivoted into engagement with a vertical member positioned in the vertical member receiving cavity. At least three lower pressure members are substantially equally spaced around the circumferential sidewalls of the vertical member receiving cavity adjacent the bottom. The pressure members are pivotally mounted whereby they are pivoted into engagement with a vertical member positioned in the vertical member receiving cavity. Means are provided for locking the pressure members in a selected pivotal position.

With the vertical member support stand, as described above, there are a minimum of six pressure members, all of which individually can be brought into engagement with a trunk of a vertical member positioned in the vertical member receiving cavity. It is preferred that an upstanding spike is secured to the bottom of the vertical member receiving cavity in a substantially central position relative to the circumferential sidewalls. The presence of the spike prevents a lateral sliding movement of the vertical member along the bottom of the vertical member receiving cavity.

There are a number of ways of locking the pressure members in a selected pivotal position. It is preferred that each of the pressure members has a mounting end and a vertical member engaging end. The mounting end has a gear segment along its peripheral edge and a transverse mounting aperture. The means for locking the pressure members in a selected pivotal position includes a gear engaging locking member movable between an engaged and a disengaged position. In the engaged position the locking member engages the gear segment at the mounting end of the pressure member. In the disengaged position the locking member is spaced from the pressure member. It is preferred that the locking member is a pivotally mounted member with at least one projecting engagement tooth.

BRIEF DESCRIPTION OF THE DRAWINGS

These and other features of the invention will become more apparent from the following description in which reference is made to the appended drawings, wherein.

DETAILED DESCRIPTION OF THE PREFERRED EMBODIMENT

Figure 2:
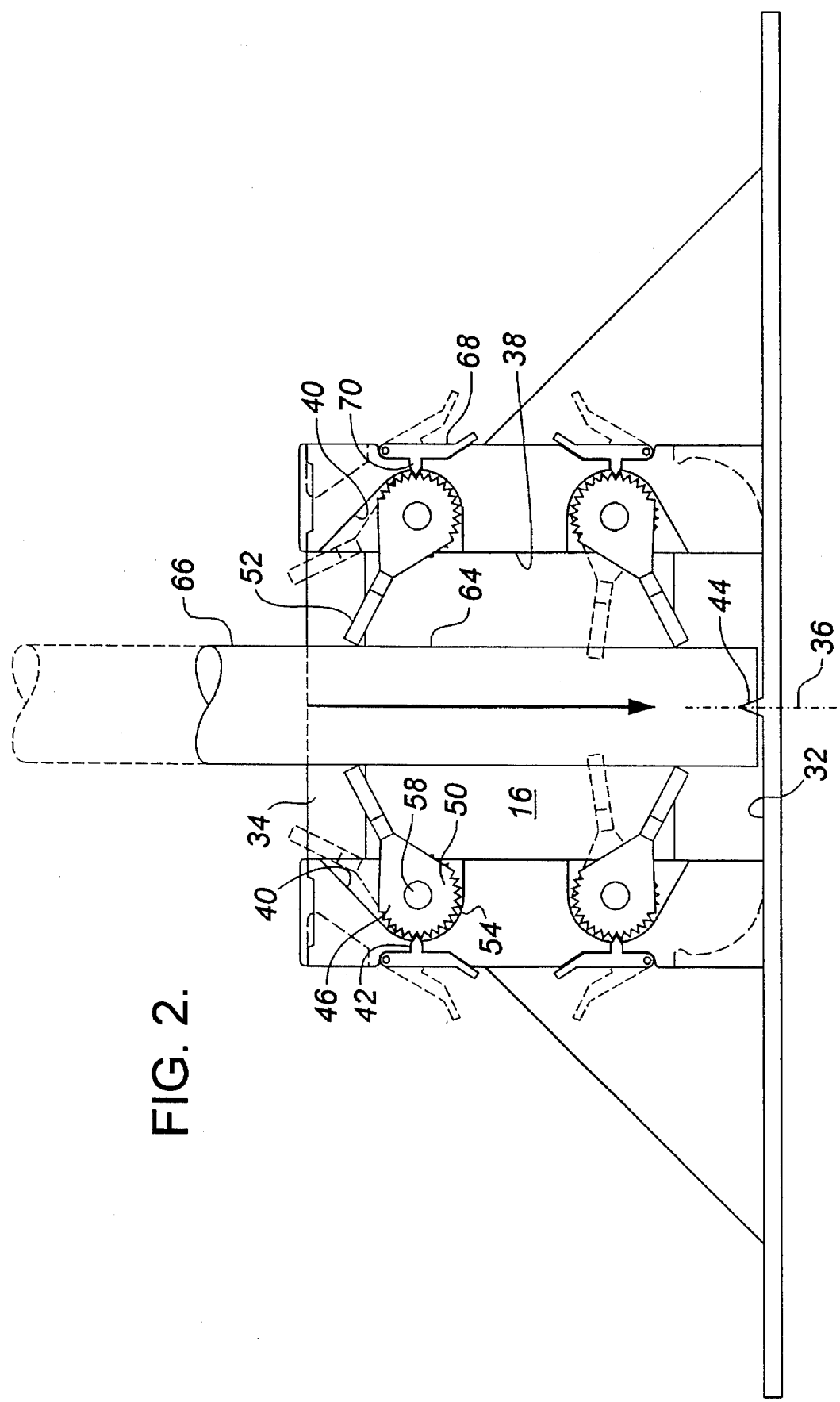
FIG. 2 is a side elevation view in longitudinal section of the vertical member support stand illustrated in FIG. 1.
Figure 3:
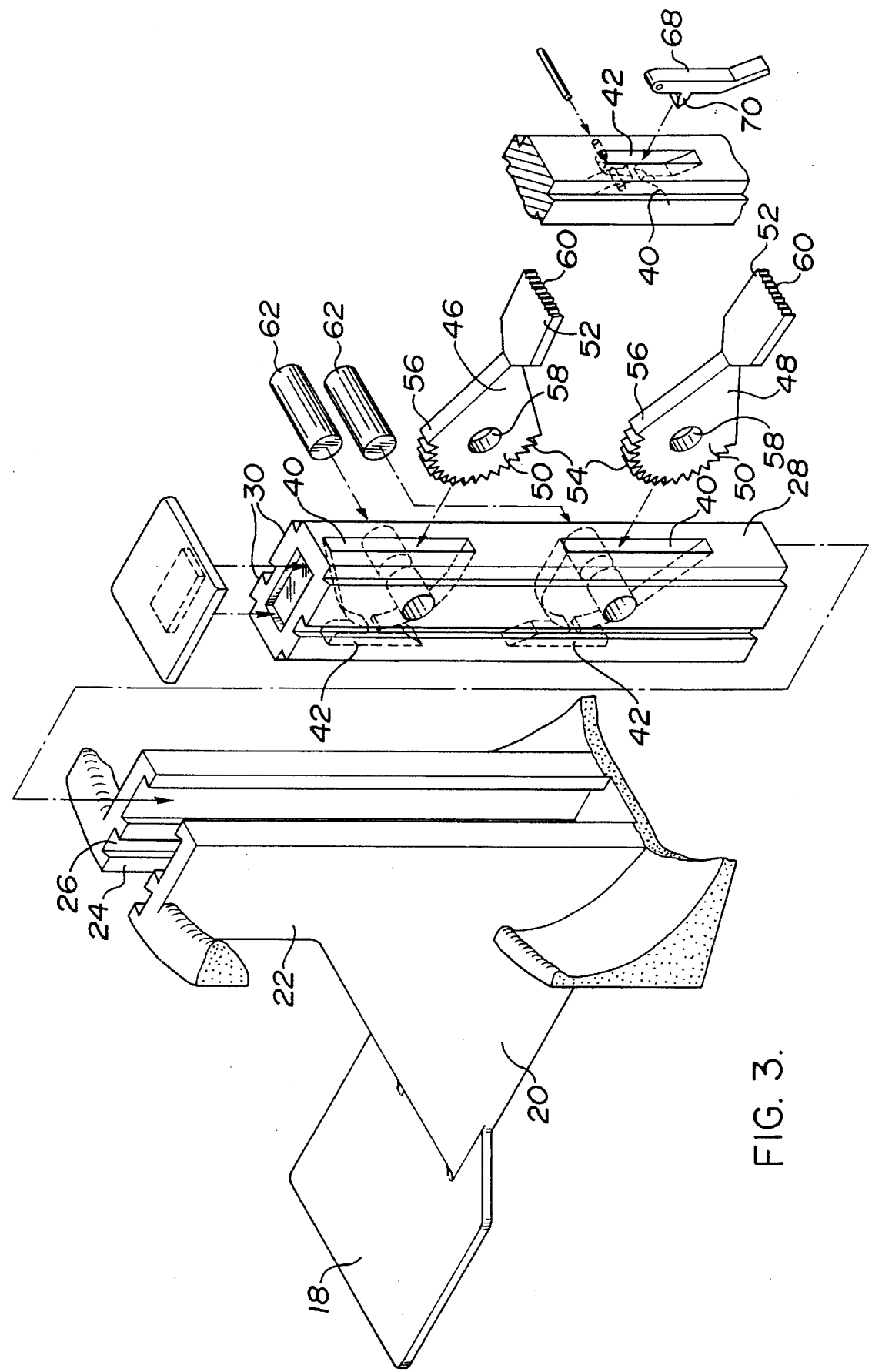
FIG. 3 is a an exploded perspective view of a portion of the vertical member support stand illustrated in FIG. 1.

The preferred embodiment, a vertical member support stand generally identified by reference numeral 10, will now be described with reference to FIGS. 1 through 3.

Figure 1:
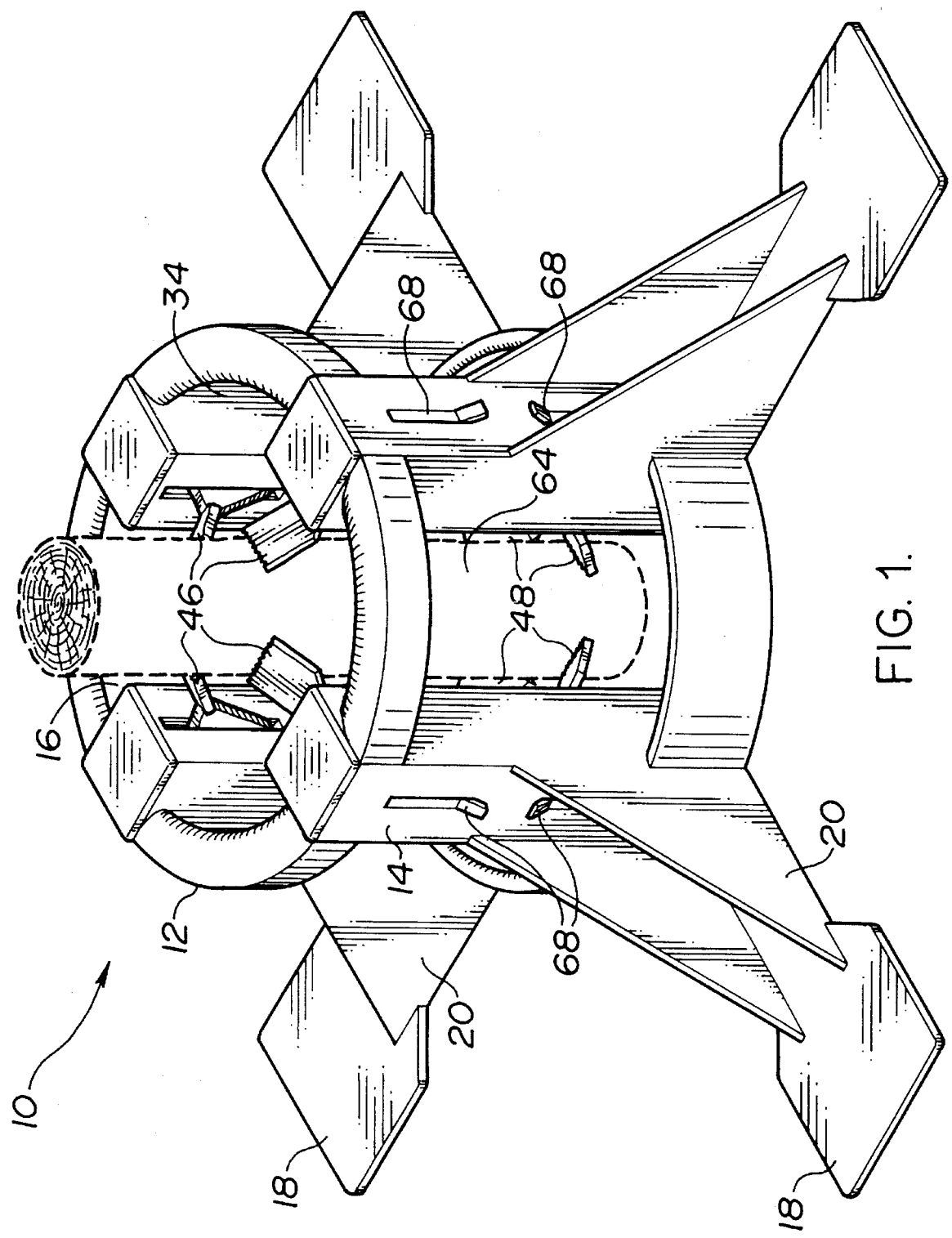
FIG. 1 is a perspective view of a vertical member support stand constructed in accordance with the teachings of the present invention.

Referring to FIG. 1, vertical member support stand 10 consists of a body 12 with an exterior surface 14, a generally tubular vertical member receiving cavity 16 and stabilizing feet 18 projecting radially outwardly from exterior surface 14 away from body 12. Strengthening gusset members 20 are secured between exterior surface 14 and stabilizing feet 18. Referring to FIG. 3, is can be seen that for ease of fabrication and assembly body 12 is made in several pieces. The primary piece is a shell 22 having insert receiving channels 24 which have interior dove-tail grooves 26. Parallelepiped inserts 28 fit into insert receiving channels 24. Inserts 28 have dove-tail tongues 30 which mate with dove-tail grooves 26. Referring to FIG. 2, cavity 16 has a bottom 32, a top opening 34, an axis 36 extending between bottom 32 and top opening 34 and circumferential sidewalls 38. Circumferential sidewalls 38 having generally arcuate channel-form pockets 40 which are parallel to axis 36 and have a slot 42 which communicates with exterior surface 14. An upstanding spike 44 is secured to bottom 32 of vertical member receiving cavity 16 in a substantially central position relative to circumferential sidewalls 38, ie. substantially co-axial with axis 36. Referring to FIG. 1, four upper pressure members 46 are substantially equally spaced around circumferential sidewalls 38 of vertical member receiving cavity 16 adjacent to top opening 34. Although they are not all fully visible from the views provided there are also four lower pressure members 48 which are substantially equally spaced around circumferential sidewalls 38 of vertical member receiving cavity 16 adjacent to bottom 32. Referring to FIG. 3, each of pressure members 46 and 48 having a mounting end 50 and a vertical member engaging end 52. Mounting end 50 has a gear segment 54 along its peripheral edge 56 and a transverse mounting aperture 58.

Vertical member engaging end 52 has projecting teeth 60. Referring to FIG. 2, mounting end 50 of each of pressure members 46 and 48 is received in one of pockets 40 in circumferential sidewall 38 of vertical member receiving cavity 16. A pivot pin 62 extends through mounting aperture 58 to pivotally mount pressure members 46 and 48. As is apparent from a review of FIG. 2, pressure members 46 and 48 pivot into engagement with a vertical member 64 which in this case is the trunk of a tree 66 positioned in vertical member receiving cavity 16. Locking members 68 are pivotally mounted to exterior surface 14 of body 12. Each of locking members 68 has a projecting engagement tooth 70. Locking members 68 are pivotally movable between an engaged and a disengaged position. The disengaged position is shown in ghost lines on FIG. 2. In this disengaged position locking member 68 is spaced from pressure member 46 and 48. The engaged position is shown in FIG. 2. In this engaged position engagement tooth 70 of locking member 68 projects through slot 42 to engage gear segment 54 at mounting end 50 of pressure members 46 or 48. This locks pressure members 46 and 48 in a selected pivotal position.

The use and operation of vertical member support stand 10 will now be described with reference to FIGS. 1 through 3. Vertical member 64 is inserted into vertical member receiving cavity 16 in the manner illustrated in FIG. 2 until vertical member 64 is impaled upon upstanding spike 44. As vertical member 64 approaches bottom 32 of vertical member receiving cavity 16, the four lower pressure members 48 are pushed downwardly. Lower pressure members are locked in position by pivoting locking member 68 to bring engagement tooth 70 into engagement with gear segment 54. The four upper pressure members 46 are then pivoted into engagement with vertical member 64 and locked in position with locking members 68 in a like fashion.

It will be apparent to one skilled in the art that having four independent pressure members enables vertical member support stand 10 to more readily adapt to irregular shaped vertical member trunks. It will also be apparent to one skilled in the art that modifications may be made to the illustrated embodiment without departing from the spirit and scope of the invention as defined by the claims. In particular, the number of pressure members 46 and 48 can be reduced to three of each or increased to more than four. Four is preferred merely because it provides the balanced support that is desired.

THE EMBODIMENTS OF THE INVENTION IN WHICH AN EXCLUSIVE PROPERTY OR PRIVILEGE IS CLAIMED ARE AS FOLLOWS:

1. A vertical member support stand, comprising:

a body with a generally tubular vertical member receiving cavity, the cavity having a bottom, a top opening, and circumferential sidewalls;

b. at least three upper pressure members substantially equally spaced around the circumferential sidewalls of the vertical member receiving cavity adjacent the top opening, the pressure members being pivotally mounted whereby they are pivoted into engagement with a vertical member positioned in the vertical member receiving cavity;

c. at least three lower pressure members substantially equally spaced around the circumferential sidewalls of the vertical member receiving cavity adjacent the bottom, the pressure members being pivotally mounted whereby they are pivoted into engagement with a vertical member positioned in the vertical member receiving cavity, each of the pressure members has a mounting end and a vertical member engaging end, the mounting end having a gear segment along its peripheral edge and a transverse mounting aperture; and d. means for locking the pressure members in a selected pivotal position, including a gear engaging locking member movable between an engaged and a disengaged position, in the engaged position the locking member engages the gear segment at the mounting end of the pressure member, in the disengaged position the locking member is spaced from the pressure member.

2. The vertical member support stand as defined in claim 1, wherein an upstanding spike is secured to the bottom of the vertical member receiving cavity in a substantially central position relative to the circumferential sidewalls.

3. The vertical member support stand as defined in claim 1, wherein the mounting end of each of the pressure members is receiving in a pocket in the circumferential sidewall of the vertical member receiving cavity.

4. The vertical member support stand as defined in claim 1, wherein the body has feet projecting radially outwardly away from the body.

5. The vertical member support stand as defined in claim 1, wherein the locking member is a pivotally mounted member with a projecting engagement tooth.

6. A vertical member support stand, comprising:

a. a body with an exterior surface, a generally tubular vertical member receiving cavity and stabilizing feet projecting radially outwardly from the exterior surface away from the body, the cavity having a bottom, a top opening, an axis extending between the bottom and the top opening and circumferential sidewalls, the circumferential sidewalls having generally arcuate channel-form pockets which are parallel to the cavity axis and have a slot which communicates with the exterior surface;

b. an upstanding spike secured to the bottom of the vertical member receiving cavity in a substantially central position relative to the circumferential sidewalls;

c. at least three upper pressure members substantially equally spaced around the circumferential sidewalls of the vertical member receiving cavity adjacent the top opening, each of the pressure members having a mounting end and a vertical member engaging end, the mounting end having a gear segment along its peripheral edge and a transverse mounting aperture, the mounting end of each of the pressure members is received in one of the pockets in the circumferential sidewall of the vertical member receiving cavity with a pivot pin extending through the mounting aperture such that the pressure member pivots into engagement with a vertical member positioned in the vertical member receiving cavity;

d. at least three lower pressure members substantially equally spaced around the circumferential sidewalls of the vertical member receiving cavity adjacent the bottom, each of the pressure members having a mounting end and a vertical member engaging end, the mounting end having a gear segment along its peripheral edge and a transverse mounting aperture, the mounting end of each of the pressure members is received in one of the pockets in the circumferential sidewall of the vertical member receiving cavity with a pivot pin extending through the mounting aperture such that the pressure member pivots into engagement with a vertical member positioned in the vertical member receiving cavity; and e. locking members with at least one projecting engagement tooth pivotally mounted to the exterior of the body, the locking members being pivotally movable between an engaged and a disengaged position, in the disengaged position the locking member is spaced from the pressure member, in the engaged position the at least one engagement tooth of the locking member projects through the slot to engage the gear segment at the mounting end of the pressure member thereby locking the pressure members in a selected pivotal position.

7. A vertical member support stand, comprising:

a. a body with a generally tubular vertical member receiving cavity, the cavity having a bottom, a top opening, and circumferential sidewalls, the circumferential sidewalls having a plurality of pockets;

b. at least three upper pressure members substantially equally spaced around the circumferential sidewalls of the vertical member receiving cavity adjacent the top opening, the pressure members being pivotally mounted whereby they are pivoted into engagement with a vertical member positioned in the vertical member receiving cavity;

c. at least three lower pressure members substantially equally spaced around the circumferential sidewalls of the vertical member receiving cavity adjacent the bottom, the pressure members being pivotally mounted whereby they are pivoted into engagement with a vertical member positioned in the vertical member receiving cavity, each of the pressure members having a mounting end that is received in one of the pockets in the circumferential sidewall of the vertical member receiving cavity; and d. means for locking the pressure members in a selected pivotal position.

* * * * *